US00RE49822E

(19) United States
(12) Reissued Patent
Astakhov et al.

(10) Patent Number: US RE49,822 E
(45) Date of Reissued Patent: Jan. 30, 2024

(54) PATCH ANTENNA WITH WIRE RADIATION ELEMENTS FOR HIGH-PRECISION GNSS APPLICATIONS

(71) Applicant: Topcon Positioning Systems, Inc., Livermore, CA (US)

(72) Inventors: Andrey Vitalievich Astakhov, Moscow (RU); Dmitry Vitalievich Tatarnikov, Moscow (RU); Pavel Petrovich Shamatulsky, Moscow (RU)

(73) Assignee: TOPCON POSITIONING SYSTEMS, INC., Livermore, CA (US)

(21) Appl. No.: 17/365,977

(22) Filed: Jul. 1, 2021

Related U.S. Patent Documents

Reissue of:
(64) Patent No.: 10,381,734
Issued: Aug. 13, 2019
Appl. No.: 16/094,306
PCT Filed: Mar. 10, 2017
PCT No.: PCT/RU2017/000124
§ 371 (c)(1),
(2) Date: Oct. 17, 2018
PCT Pub. No.: WO2018/164599
PCT Pub. Date: Sep. 13, 2018

(51) Int. Cl.
*H01Q 9/04* (2006.01)
*H01Q 5/385* (2015.01)

(52) U.S. Cl.
CPC ..... *H01Q 9/0428* (2013.01); *H01Q 5/385* (2015.01); *H01Q 9/0407* (2013.01); *H01Q 9/0414* (2013.01); *H01Q 9/0442* (2013.01)

(58) Field of Classification Search
CPC ... H01Q 9/0428; H01Q 9/0407; H01Q 9/0421
See application file for complete search history.

(56) References Cited

U.S. PATENT DOCUMENTS 6,252,549 B1 * 6/2001 Derneryd ..... H01Q 13/18 343/770
6,480,170 B1 * 11/2002 Langley ..... H01Q 9/0407 343/826
6,839,028 B2 1/2005 Lee
9,184,503 B2 11/2015 Tatarnikov et al. . H01Q 9/0428
9,350,080 B2 5/2016 Tatarnikov et al.
2009/0273522 A1 * 11/2009 Tatarnikov ..... H01Q 9/0407 343/700 MS
2015/0077299 A1 * 3/2015 Tatarnikov ..... H01Q 5/328 343/749

FOREIGN PATENT DOCUMENTS

RU 2012154791 A 10/2014
WO 2009099427 A1 8/2009

OTHER PUBLICATIONS

International Search Report and Written Opinion dated Dec. 14, 2017, in connection with International Patent Application No. PCT/RU2017/000124, 6 pgs.

* cited by examiner

*Primary Examiner* — Nick Corsaro
(74) *Attorney, Agent, or Firm* — Chiesa Shahinian & Giantomasi PC

(57) ABSTRACT

A right-hand circularly-polarized patch antenna comprising a ground plane and a patch connected to each other with one or more wires for which the wire shape and location of the end points are selected such that they do not cause an antenna mismatch, and the electrical current carried in the wires produces an extra electromagnetic field subtracted from the patch field in the nadir direction.

22 Claims, 10 Drawing Sheets

PATCH ANTENNA WITH WIRE RADIATION ELEMENTS FOR HIGH-PRECISION GNSS APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *This is a reissue application of U.S. Pat. No. 10,381,734, filed Oct. 17, 2018, as application Ser. No. 16/094,306 and issued Aug. 13, 2019, which* is a national stage (under 35 U.S.C. 371) of International Patent Application No. PCT/RU2017/000124, filed Mar. 10, 2017, *both of* which [is herein] *are* incorporated by reference *herein* in [its] *their* entirety.

TECHNICAL FIELD

The present invention relates generally to antennas, and more particularly to patch antennas used in Global Navigation Satellite Systems (GNSS).

BACKGROUND OF THE INVENTION

A wide range of consumer, commercial, and industrial applications utilize patch antennas in GNSS applications which can determine locations with high accuracy. Currently deployed systems include the United States Global Positioning System (GPS) and the Russian GLONASS, and others such as the European GALILEO system are under development.

In a GNSS, a navigation receiver receives and processes radio signals transmitted by satellites located within a line-of-sight of the navigation receiver. A critical component of a GNSS is the receiver antenna. Key properties of the receiver antenna include bandwidth, multipath rejection, size, and weight. High-accuracy navigation receivers typically process signals from two frequency bands. For example, two common frequency bands are a low-frequency (LF) band in the range of 1164-1300 MHz, and a high-frequency (HF) band in the range of 1525-1610 MHz.

One reason for reduced GNSS positioning accuracy of land objects is related to receiving not only line-of-sight satellite signals but also signals reflected from surrounding objects, and especially from the Earth's surface (i.e., the ground). The strength of such signals depends directly on the antenna's directional pattern (DP) in the rear hemisphere. A right-hand circularly polarized signal is used as a working signal in navigation systems. As will be appreciated, a low level of directional pattern in the lower hemisphere (particularly in the nadir direction) is a standard antenna requirement, and typically a reduction in the antenna's weight and overall dimensions is desirable.

It is well-known that patch antennas are widely used in GNSS applications due to certain technical and operational advantages such as low height which enables low-profile patch antennas to be constructed. As will be understood, a conventional patch antenna typically includes a radiating patch located over a ground plane such that the lateral dimension (i.e., length) of the ground plane is longer than that of the patch. To provide qualitative signal reception from navigation satellites across the celestial hemisphere up to angles close to the horizon, the patch antenna should also have a wide enough Directional Pattern (DP) in the forward (i.e., upper) hemisphere. The width of a patch antenna DP is determined by the length of the patch such that the shorter the patch is, the wider the DP will be. The length of the patch is normally 0.2 . . . 0.3λ, wherein λ is the wavelength in free space and the minimal length is determined by the operational bandwidth. To provide for a resonance mode on such lengths, a dielectric between the ground plane and patch or capacitive elements is used.

A considerable contribution to positioning errors in GNSS systems is attributable to signal(s) reflected from the ground. To reduce this multipath error, a low DP level should be provided in the backward hemisphere, and one conventional solution is to choose a ground plane length equal to at least 0.5λ. The size of the ground plane determinates the overall antenna dimension, and the aforementioned wavelength corresponding to the minimal frequency of the operation range. For GNSS, this frequency is 1164 MHz, which corresponds to 258 mm which translates to an antenna size of at least 130 mm. Any further reduction in the length of the ground plane results in a noticeable increase in DP level in the backward hemisphere. If the length of the ground plane is equal to that of the patch, the DP level in the backward hemisphere is the same as in the forward hemisphere which is unacceptable for the standard operation of high-precision GNSS receivers. Therefore, a minimal dimension of standard patch antennas is limited by the length of the ground plane which provides the desired low level of DP in the lower hemisphere, and particularly in the nadir direction (i.e., the desired level of multipath suppression).

One example of an antenna providing for low DP level in the nadir direction is described in U.S. Pat. No. 9,184,503 where the antenna's design includes a length of ground plane that is equal to or smaller than the length of the patch. To achieve this design, a loop radiator is located around the patch whereby the radiator is excited by dual-wire lines connected to a separate power supply. The power supply provides excitation of the loop radiator with such amplitude and phase that the field of the patch is subtracted from the field of the loop radiator. However, potential drawbacks of such a design are the overall design complexity and the requirement of a separate supply line to power the loop radiator.

Therefore, a need exists for an improved high-precision GNSS antenna design with lower complexity, smaller dimensions, and efficient multipath suppression.

BRIEF SUMMARY OF THE EMBODIMENTS

In accordance with an embodiment, a single-band right-hand circularly-polarized patch antenna comprises a ground plane and a patch connected to each other with at least four (4) wires for which the wire shape and location of the end points are selected such that they do not cause an antenna mismatch, and the electrical current carried in the wires produces an extra electromagnetic field subtracted from the patch electromagnetic field in the nadir direction. In accordance with the embodiment, this facilitates an antenna with low DP level (i.e., Down/Up level) in the nadir direction and with a smaller (and shorter) ground plane such that the size of the ground plane becomes practically as long as the patch, and there is no additional power supply necessary to power the wires. In accordance with an embodiment the patch antenna is a single-band right-hand circularly-polarized patch antenna providing a reduced directional pattern in the backward hemisphere.

In accordance with an embodiment the patch antenna is a dual-band right-hand circularly-polarized stacked-patch antenna comprising a ground plane, a low-frequency (LF) patch, a high-frequency (HF) patch, and at least four wires. Each of the wires is connected to the ground plane and LF patch via reactive impedance elements, and the current flowing through these wires produces an additional electromagnetic field that is subtracted from the electromagnetic field of the LF patch in the nadir direction. Further, in accordance with this embodiment, due to the possibility that induced currents in the wires may result in an undesirable increase in DP level in the backward hemisphere within HF range, the mode of operation for reactive impedance elements is selected such that undesirable effects of the wires in the HF range are minimized or eliminated completely.

These and other advantages of the embodiments will be apparent to those of ordinary skill in the art by reference to the following detailed description and the accompanying drawings.

DETAILED DESCRIPTION

In accordance with an embodiment, a single-band right-hand circularly-polarized patch antenna comprises a ground plane and a patch connected to each other with at least four (4) wires for which the wire shape and location of the end points are selected such that they do not cause an antenna mismatch, and the electrical current carried in the wires produces an extra electromagnetic field subtracted from the patch electromagnetic field in the nadir direction. In accordance with the embodiment, this facilitates an antenna with low DP level (i.e., Down/Up level) in the nadir direction and with a smaller (and shorter) ground plane until the size (i.e., length) of the ground plane is as long as the patch, and there is no additional power supply necessary to power the wires.

Figure 1:
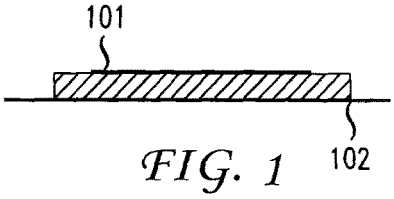
FIG. 1 PRIOR ART
FIG. 1 shows a conventional patch antenna.

As noted previously, it is well-known that patch antennas are widely used in GNSS systems due to their low height which enables the design of certain low-profile devices. As shown in FIG. 1, a conventional patch antenna includes radiating patch 101 located over ground plane 102, the lateral dimension (length) of ground plane 102 being longer than that of patch 101.

Figure 2:
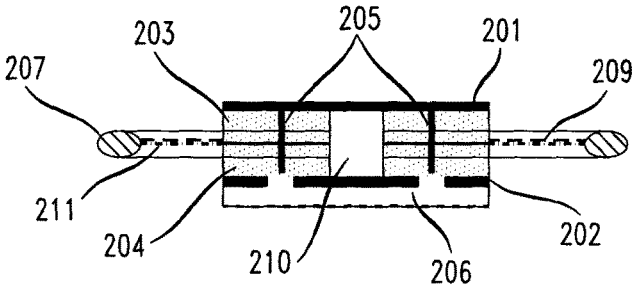
FIG. 2 PRIOR ART
FIG. 2 shows a conventional antenna with a loop radiator.

As also noted previously, one example of an antenna providing for low DP level in the nadir direction is described in U.S. Pat. No. 9,184,503, and shown in FIG. 2, where the antenna's design includes the length of ground plane 206 that is equal to or smaller than the length of patch 201 which is disposed above flat metal ground plane 202. To achieve this design, loop radiator 207 is located around patch 205 hereby the radiator is excited by dual-wire lines 209 connected to a separate power supply (not shown). In this design, there is a dielectric filler made in the form of two dielectric discs 203 and 204 with holes for exciting pins 205 and cavity 210. Between these elements, there are the dual-wire lines 209 to power loop radiator 207, and reference dielectric substrate 211 to fix it. The power supply provides excitation of loop radiator 207 with such amplitude and phase that the field of patch 201 is subtracted from the field of loop radiator 207. However, potential drawbacks are overall design complexity and the requirement of a separate supply line to power the loop radiator.

Figure 3:
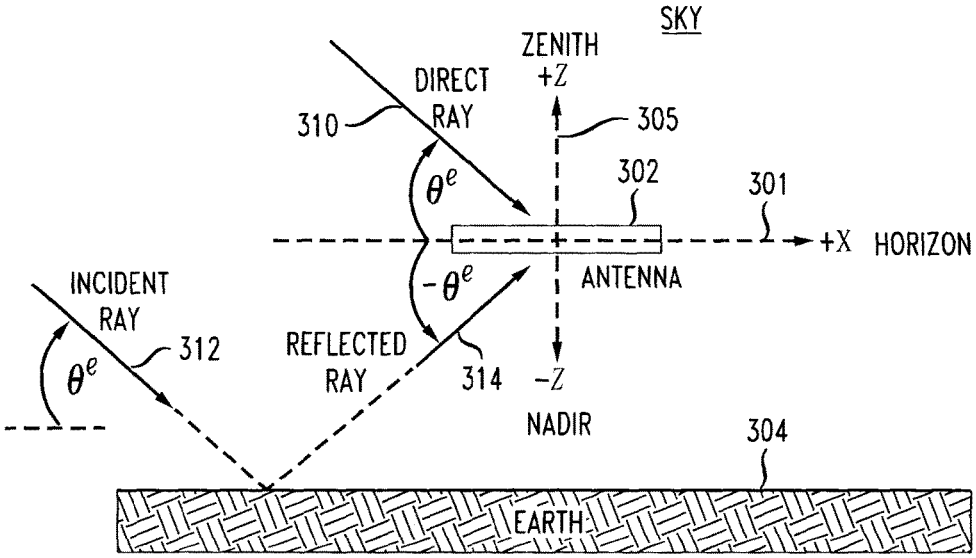
FIG. 3 shows an illustration of a GNSS antenna positioned above the Earth.

FIG. 3 shows a schematic of GNSS antenna 302 positioned above Earth 304. As used herein, the term "Earth" includes both land and water environments. To avoid confusion with "electrical" ground (as used in reference to a ground plane), "geographical" ground (as used in reference to land) is not used herein. To simplify the illustration shown in FIG. 3, supporting structures for GNSS antenna 302 are not shown. Shown in FIG. 3 is a reference Cartesian coordinate system with X-axis 301 and Z-axis 305. The Y-axis (not shown) points into the plane of the illustration of FIG. 3. In an open-air environment, the +Z (up) direction, referred to as the zenith, points towards the sky, and the −Z (down) direction, referred to as the nadir, points towards Earth 304. The X-Y plane lies along the local horizon plane.

In FIG. 3, electromagnetic waves (carrying electromagnetic signals) are represented by rays with an elevation angle $\theta^e$ with respect to the horizon. The horizon corresponds to $\theta^e$=0 deg; the zenith corresponds to $\theta^e$=+90 deg; and the nadir corresponds to $\theta^e$=−90 deg. Rays incident from the open sky, such as ray 310 and ray 312, have positive values of elevation angle. Rays reflected from Earth 304, such as ray 314, have negative values of elevation angle. Herein, the region of space with positive values of elevation angle is referred to as the "direct signal region" and is also alternatively referred to as the "forward (or top) hemisphere". Herein, the region of space with negative values of elevation angle is referred to as the "multipath signal region" and is also alternatively referred to as the "backward (or bottom) hemisphere". Ray 310 impinges directly on the antenna 302 and is referred to as the direct ray 310; the angle of incidence of the direct ray 310 with respect to the horizon is $\theta^e$. Ray 312 impinges directly on Earth 304; the angle of incidence of ray 312 with respect to the horizon is $\theta^e$, and assume ray 312 is specularly reflected. Ray 314 (i.e., reflected ray 314), impinges on the antenna 302; the angle of incidence of relfected ray 315 with respect to the horizon is $-\theta^e$. To numerically characterize the capability of an antenna to mitigate the reflected signal, the following ratio is commonly used:

$$DU(\theta^e) = \frac{F(-\theta^e)}{F(\theta^e)} \tag{E1}$$

The parameter $DU(\theta^e)$ (Down/Up ratio) is equal to the ratio of the antenna pattern level $F(-\theta^e)$ in the backward hemisphere to the antenna pattern level $F(\theta^e)$ in the forward hemisphere at the mirror angle, where F represents a voltage level. Expressed in dB, the ratio is:

$$DU(\theta^e)\ (dB)=20 \log DU(\theta^e) \tag{E2}$$

A commonly used characteristic parameter is the Down/Up ratio at $\theta^e$=+90 deg $$DU_{90} = DU(\theta^e = 90°) = \frac{F(-90°)}{F(90°)} \tag{E3}$$

Figure 4:
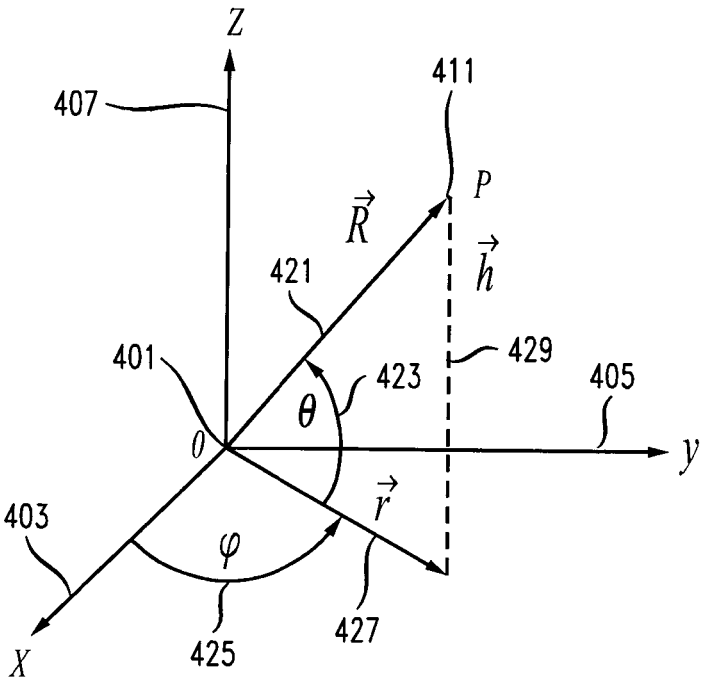
FIG. 4 shows an illustrative antenna reference coordinate system.

The geometry of antenna systems is described with respect to the illustrative Cartesian coordinate system shown in FIG. 4. FIG. 4 shows a perspective view with a Cartesian coordinate system having origin o 401, x-axis 403, y-axis 405, and z-axis 407. The coordinates of point P 411 are P(x, y, z). Let $\vec{R}$ 421 represent the vector from o to P. The vector $\vec{R}$ can be decomposed into the vector $\vec{r}$ 427 and the vector $\underline{h}$ 429, where $\underline{r}$ is the projection of $\vec{R}$ onto the x-y plane, and $\vec{h}$ is the projection of $\vec{R}$ onto the z-axis 407.

The coordinates of P 411 can also be expressed in the spherical coordinate system and in the cylindrical coordinate system. In the spherical coordinate system, the coordinates of P are P(R,θ,φ), where $R=|\vec{R}|$ is the radius, θ 423 is the polar angle measured from the x-y plane, and φ 425 is the azimuthal angle measured from the x-axis. In the cylindrical coordinate system, the coordinates of P are P(r,θ,h), where $r=|\vec{r}|$ is the radius, φ is the azimuthal angle, and $h=|\vec{h}|$ is the height measured parallel to the z-axis. In the cylindrical coordinate axis, the z-axis is referred to as the longitudinal axis. In geometrical configurations that are azimuthally symmetric about z-axis 407, the z-axis is referred to as the longitudinal axis of symmetry, or simply the axis of symmetry (if there is no other axis of symmetry under discussion).

The polar angle θ is more commonly measured down from the +z-axis $0 \le \theta \le \pi$). Here, the polar angle θ 423 is measured from the x-y plane for the following reason. If the z-axis 407 refers to the z-axis of an antenna system, and the z-axis 407 is aligned with the geographic Z-axis 305 in FIG. 3, then the polar angle θ 223 will correspond to the elevation angle $\theta^e$ in FIG. 3; that is, $-90° \le \theta \le +90°$, where θ=0° corresponds to the horizon, θ=+90° corresponds to the zenith, and θ=−90° corresponds to the nadir.

Figure 5A:
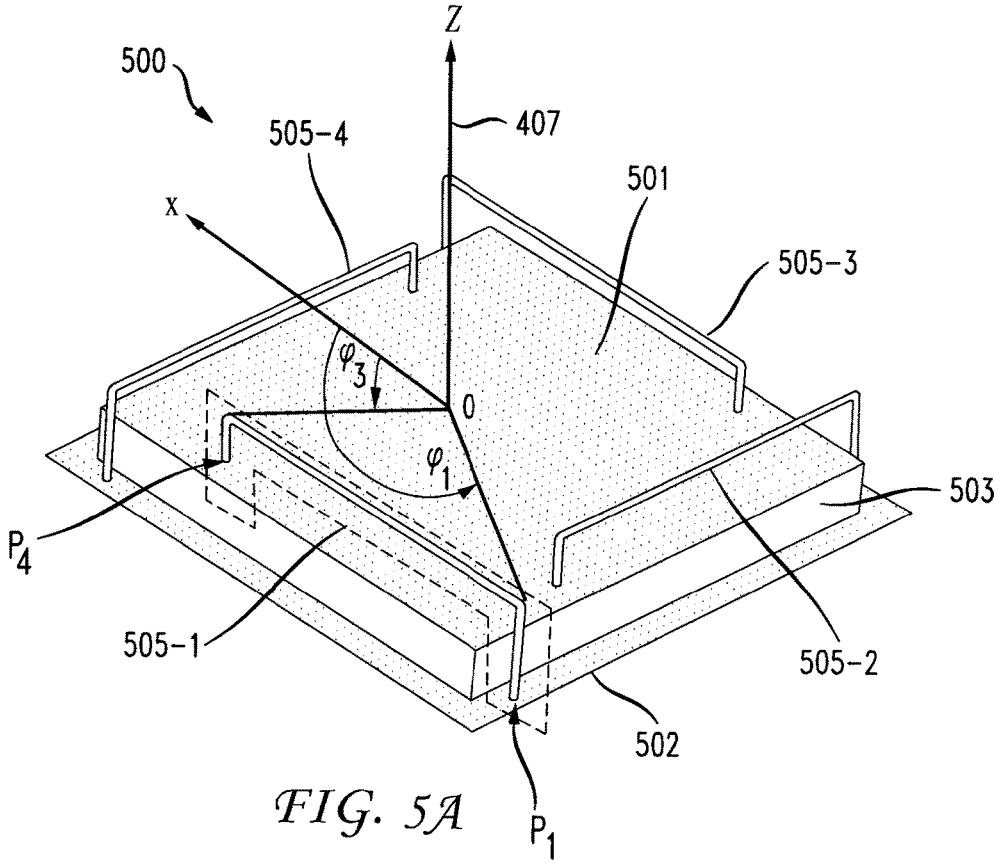
FIG. 5A shows a single band antenna in accordance with an embodiment.

FIG. 5A shows single band antenna 500 in accordance with an embodiment. In particular, a single-band right-hand circularly polarized patch antenna comprising ground plane 502, patch 501 and dielectric substrate 503. The right-hand circular-polarization mode can be implemented in a well-known manner by an excitation circuit connected to excitation pins (not shown). There are also four wires 505-1, 505-2, 505-3 and 505-4. Each wire has starting point P1 and end point P4 as will be further discussed herein below. At starting point P1 the wire is connected to ground plane 502, and at end point P4 the wire is connected to patch 501.

Figure 5B:
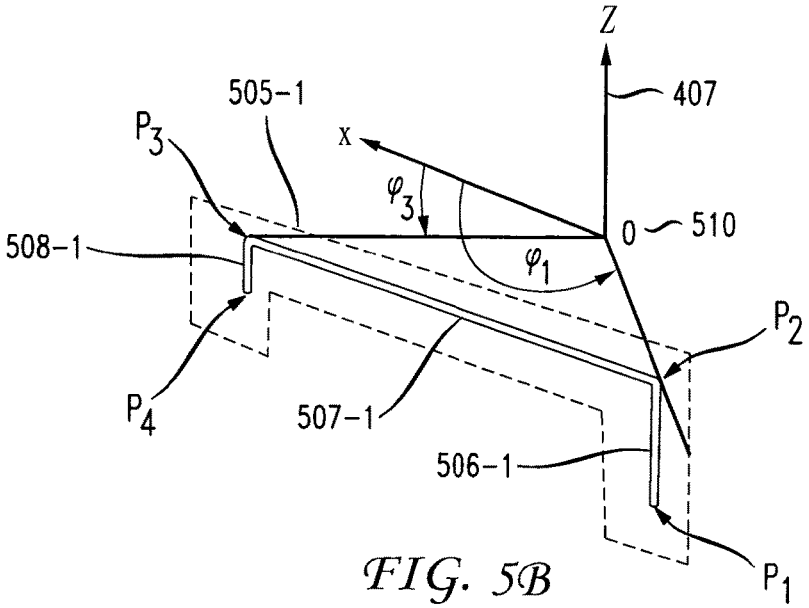
FIG. 5B shows a configuration of wires connecting a ground plane and a patch in accordance with an embodiment.

Wires 505-1, 505-2, 505-3 and 505-4 have the same (or substantially the same) design and are arranged in a rotational symmetrical manner about vertical z-axis 407 (as shown in FIG. 4) as such passing through a center of the antenna. For ease of discussion, hereinafter the designation 505-n will be understood to refer to and describe wires 505-1, 505-2, 505-3, and 505-4 (i.e., n=1, 2, 3, 4), as the context dictates Wire 505-n (e.g., 505-1) consists of three segments 506-n (e.g., 506-1), 507-n (e.g., 507-1) and 508-n (e.g., 508-1) and has four characteristic points $P_1$, $P_2$, $P_3$ and $P_4$, as shown in FIG. 5B, and each of the segments has starting and end points. That is, for segment 506-n, $P_1$ and $P_2$ are starting and end points, and for segment 507-n, $P_2$ and $P_3$ are starting and end points respectively, and for segment 508-n, such starting and end points are $P_3$ and $P_4$.

Coordinates of points $P_1$, $P_2$, $P_3$ and $P_4$ can be determined in a cylindrical coordinate system with the origin at point O 510 located onto patch 501, i.e., the vertical coordinate of patch 501 is zero. The cylindrical coordinate system has vertical axis 407 in the antenna center that is oriented from ground plane 502 to patch 501. The angular coordinate is counted from the x-axis, the direction of which can be arbitrarily selected. As shown in FIG. 5B, this direction is parallel to the side of patch 501. The angular coordinate increases counterclockwise as observed from the side of the positive direction of the vertical axis.

Point $P_1$ has coordinates $r_1,\varphi_1,z_1$, $P_2$ has coordinates $r_2,\varphi_2,z_2$, point $P_3$ has coordinates $r_3,\varphi_3,z_3$, and point $P_4$ has coordinates $r_4,\varphi_4,z_4$. Segment 506-n is vertical, and hence $r=r_2$, $\varphi=\varphi_2$. Segment 507-n is horizontal, respectively $z_2=z_3$. Segment 508-n is vertical and $r_3=r_4$, $\varphi_3=\varphi_4$. Segment 506-n is connected to the ground plane at point $P_1$, segment 508-n is connected to the patch at $P_4$. Horizontal segment 507-n is located over the patch (e.g., patch 501), i.e., $z_2>0$.

Angular coordinate $\varphi_1$ of segment 506-n connected to the ground plane (e.g., ground plane 502) is greater than angular coordinate $\varphi_3$ of segment 508-n being connected to the patch. Thus, $\varphi_1>\varphi_3$. The positional relationship of segments 506-n and 508-n will now be discussed. Using a top view, the imaginary line connecting the coordinate origin and a point of segment 507-n will rotate counterclockwise when moving from point P3 belonging to segment 508-n to point P2 belonging segment 506-n. Thus, the imaginary line connecting any point of wire 505-n will rotate counterclockwise when moving from the end point of wire 505-n (i.e., P4) to the starting point of wire 505-n (i.e., P1). In this way, it will be understood that when moving along vertical segments (508-n, 506-n) the imaginary line does not rotate.

The orientation and the positional relationship of the wires, as described above, in the right-hand circularly polarized antenna results in an electric current in horizontal segments 507-n such that the associated field is subtracted from the field of patch 501 in the nadir direction. As a result, the total antenna field in the nadir direction is substantially reduced. The reduction is due, in part, to the specific orientation of the plurality of wires such that the reduction of the total antenna field in the nadir direction is, illustratively, a function of variations between the first electromagnetic field associated with the plurality of wires and the second electromagnetic field associated with the radiating patch. In accordance with the embodiment, this variation is represented and determined by subtracting the second and first electromagnetic fields. The length of each horizontal segment 507-n lies close to a quarter of the wavelength, and the segments along with ground plane 502 can be interpreted as segments of a transmission line which are shorted at their ends by segments 506-n. These transmission lines are connected to patch 501 by segments 508-n. It is well-known that a short-circuited transmission line that is a quarter wavelength long has open-circuit impedance, and this why these connections do not cause the mismatch of the antenna formed by patch 501 and ground plane 502.

Figure 6A:
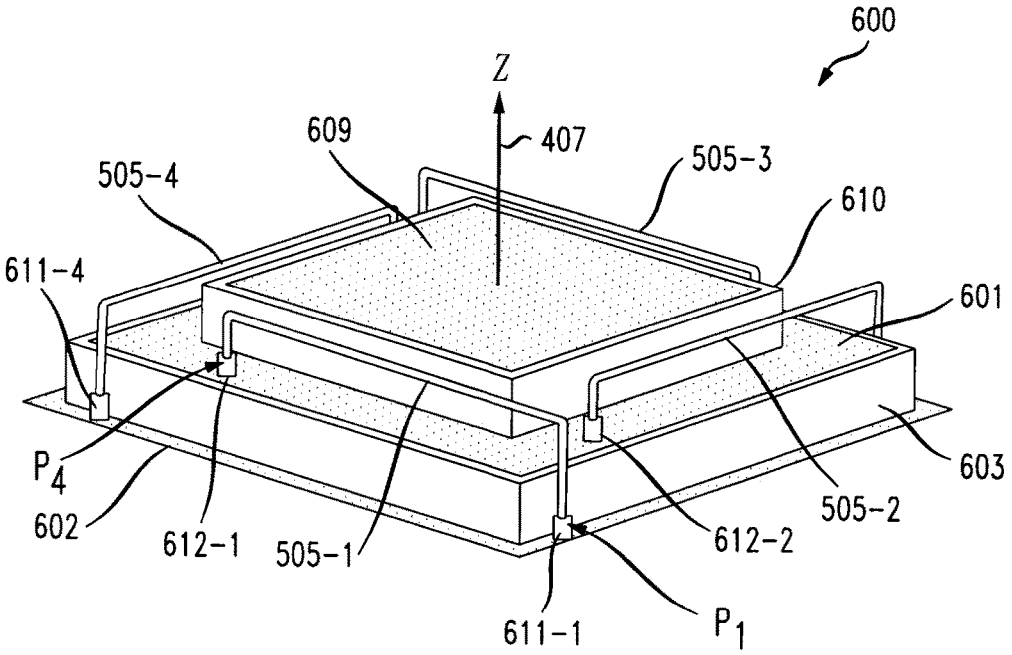
FIG. 6A shows a dual-band antenna in accordance with an embodiment.

FIG. 6A shows a further embodiment of dual-band stacked-patch antenna 600 comprising ground plane 602, LF patch 601 and HF patch (HF) 609. In the space between HF 609 patch and LF 601 patch there is dielectric 610. In the space between LF patch 601 and ground plane 602 there is dielectric 603. LF patch 601 is a ground plane for patch HF 609. There are also four wires 505-1, 505-2, 505-3, and 505-4, the design and orientation of which is as described herein above, for example, with respect to FIG. 5B there is the division of wire 505-n into segments 506-n, 507-n and 508-n, and segments 507-n are above LF patch 601. Again, in accordance with this further embodiment, the total antenna field in the nadir direction is substantially reduced as described previously.

The length of each horizontal segment 507-n is close to a quarter of a wavelength on the frequency of LF band (i.e., around 60 mm). The segments along with ground plane 602 can be considered as segments of a transmission line shorted at their ends by segments 506-n. The transmission lines are connected to LF patch 601 via segments 508-n. It is well-known, as noted above, that a short-circuited transmission line that is a quarter wavelength long has an open-circuit impedance such that these connections do not cause the mismatch of the antenna formed by patch 601 and ground plane 602.

Each of wires 505-n is connected to ground plane 602 and LF patch 601 through reactive impedance elements 611-n (e.g., 611-1, 611-2, 611-3, and 611-4) and 612-n (e.g., 612-1 and 612-2). Wire 505-1 has a starting point P1 and end point P4. At point P1 wire 505-1 is connected to reactive impedance element 611-1. Element 611-1 is in turn connected to ground plane 603. At point P4 wire 505-1 is connected to impedance element 612-1. Element 612-1 is in turn connected to LF patch 601. Elements 611-n and 612-n ensure a short circuit mode within LF band and an operation mode with practically open-circuit conditions within HF band. Such connecting eliminates undesirable effects of wires 505-n in HF band. Also, in accordance with an embodiment, elements 612-n can be eliminated such that wires 505-n can be directly connected to patch 601 at points P4.

Figure 6B:
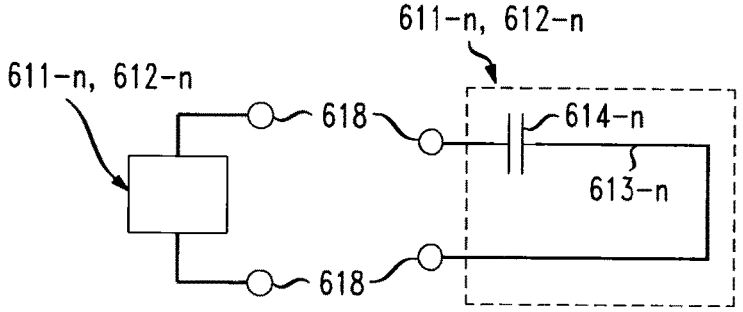
FIG. 6B shows reactive impedance elements associated with the dual-band antenna of FIG. 6A.

Wires 505-n and reactive impedance elements 611-n and 612-n are arranged in a rotational symmetrical manner to vertical z-axis 407 passing through the antenna center. Each of reactive impedance elements 611-n and 612-n, as shown in FIG. 6B, can be made as a segment of a shorted-circuit transmission line 613-n with series capacitor 614-n. Also, as shown in FIG. 6B, a reference plane from which the phase of the element's reflection factor is counted out is depicted with circles 618.

Figure 6C:
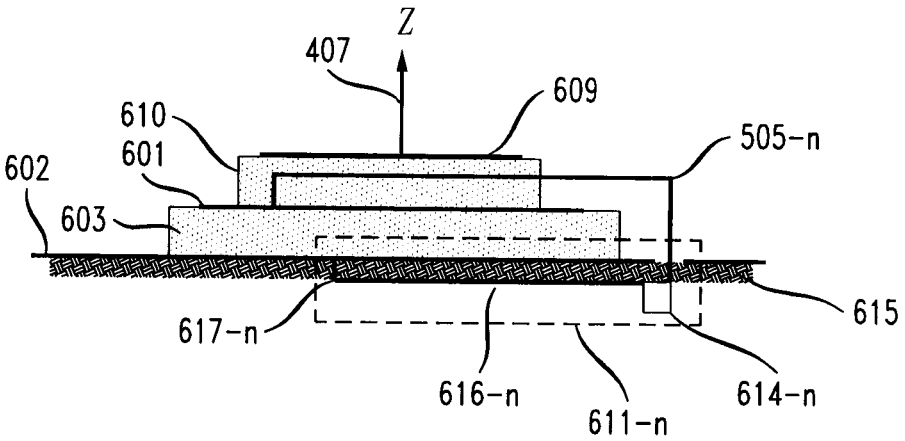
FIG. 6C shows a side view of the dual-band antenna in accordance with the embodiment of FIG. 6A.
Figure 6D:
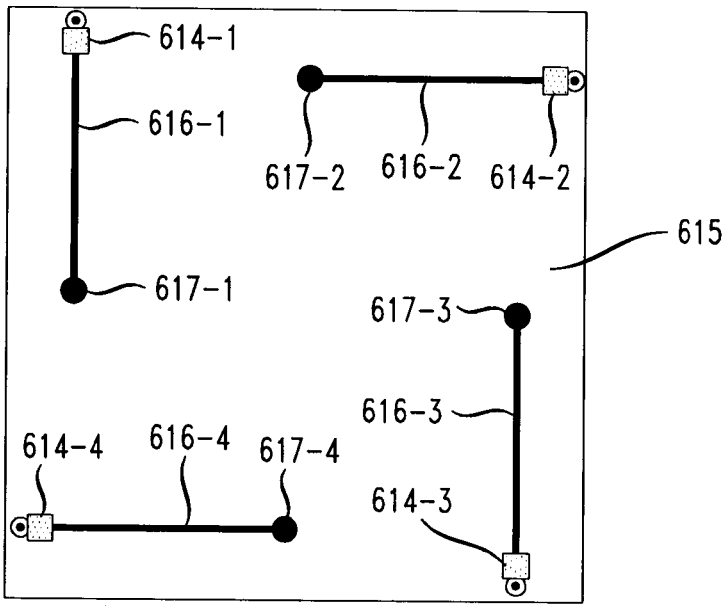
FIG. 6D shows a bottom view of a micro strip line of FIG. 6C.

FIG. 6C shows a side view of dual band antenna 600 in a further embodiment where only reactive impedance elements 611-n are present, and there are no reactive impedance elements 612-n. Each transmission line 613-n (see, FIG. 6B) is implemented in the form of micro strip line 616-n (i.e., one or more of the reactive impedance elements include a micro strip line), and dielectric substrate 615 is located under ground plane 602 such that on this substrate there are micro strip lines 616-n shorted at their ends by employing metallized holes 617-n. Antenna ground plane 602 serves as a ground plane for micro strip lines 616-n, and each wire 505-n passes through an opening in the dielectric substrate with the respective end connected to capacitor 614-n. The other end of capacitor 614-n is connected to a segment of micro strip line 616-n. FIG. 6D shows a bottom view of micro strip line 616-n from FIG. 6C where elements 614-n (e.g., elements 614-1, 614-2, 614-3, and 614-4) are arranged in a rotational symmetrical manner to vertical z-axis 407, and elements 616-n (e.g., 616-1, 616-2, 616-3, and 616-4) and 617-n (e.g., 617-1, 617-2, 617-3, and 617-4) are similarly arranged on dielectric substrate 615.

Figure 7:
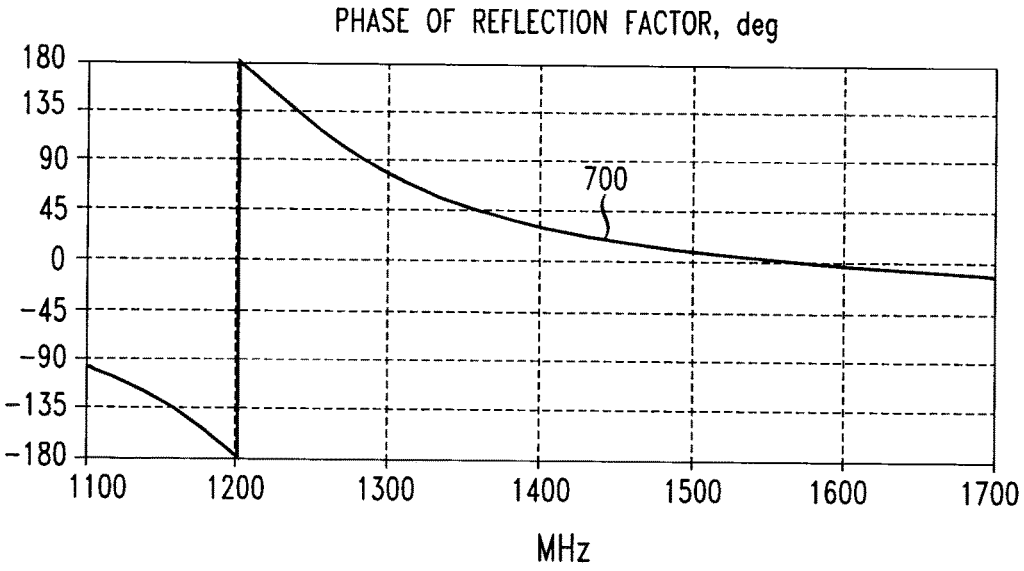
FIG. 7 shows a plot of phase of reflection factor versus frequency.

FIG. 7 shows plot 700 of phase of reflection factor versus frequency for element 611-n (as depicted in FIGS. 6C and 6D) where the length of line 616-n is 1180 mil, the capacity of capacitor 614-n is 1 pF, dielectric permeability of the substrate 615 is 3.2 and the height of the substrate is 31 mil. It can be seen from plot 700 that on LF frequencies (i.e., approximately 1200 MHz) the phase of the reflection factor is close to 180 degrees which corresponds to a shorted-circuit mode. On HF frequencies (i.e., approximately 1570 MHz) the phase of the reflection factor is approximately 0 degrees which corresponds to open-circuit conditions.

Figure 8A:
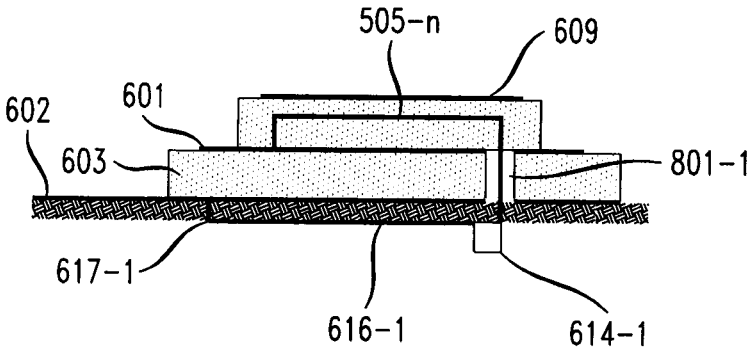
FIG. 8A shows a side view of the dual-band antenna in accordance with the embodiment of FIG. 6A.
Figure 8B:
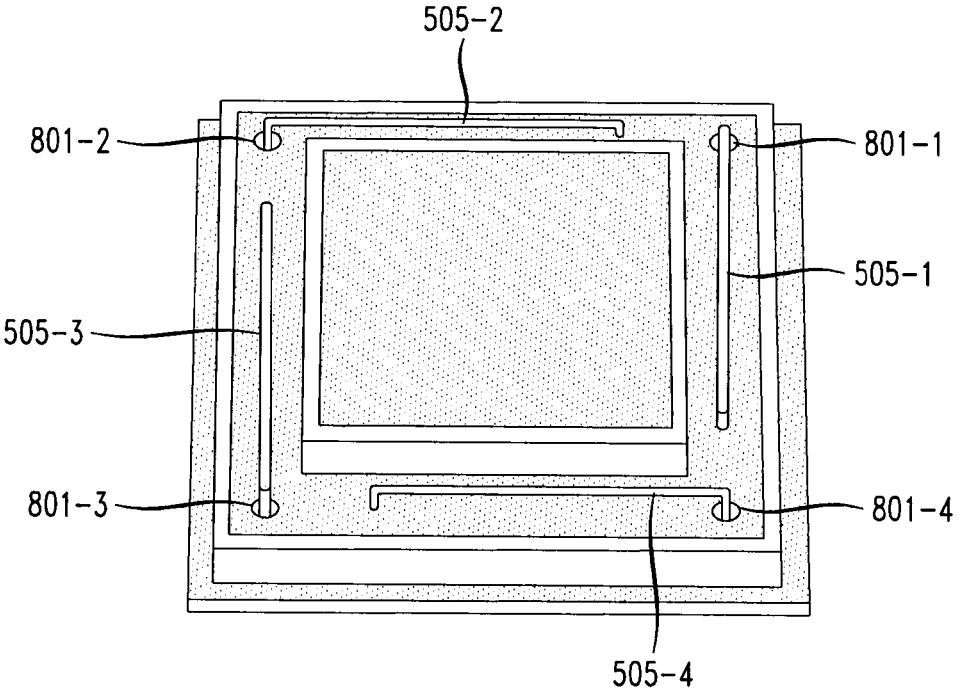
FIG. 8B shows an isometric view of the dual-band antenna in accordance with the embodiment of FIG. 6A.

In a further antenna embodiment, wires 505-n can be arranged such that the wires do not protrude outside of LF patch 601 in the top view, and this is depicted in FIG. 8A illustrating a side view thereof. Only wire 505-n (e.g., 505-1) is visible and passes through opening 801-1 in dielectric 603 and LF patch 601 without connecting with it. In this case, the size of ground plane 602 can be both greater than that of LF patch 601 and equal to it. FIG. 8B shows an isometric view of this embodiment where all four wires 505-1, 505-2, 505-3, and 505-4 are visible, and including openings 801-2, 801-3, and 801-4 in dielectric 603 and in LF patch 601.

Figure 9A:
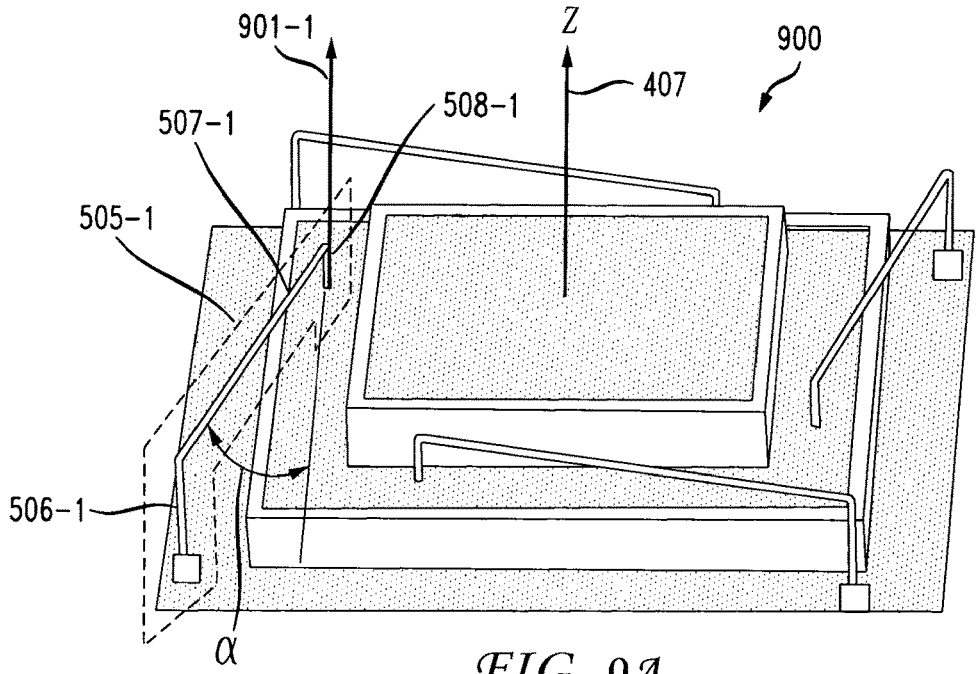
FIG. 9A shows a dual-band antenna in accordance with an embodiment wherein wires connecting the ground plane and patch are turned in a certain angle.
Figure 9B:
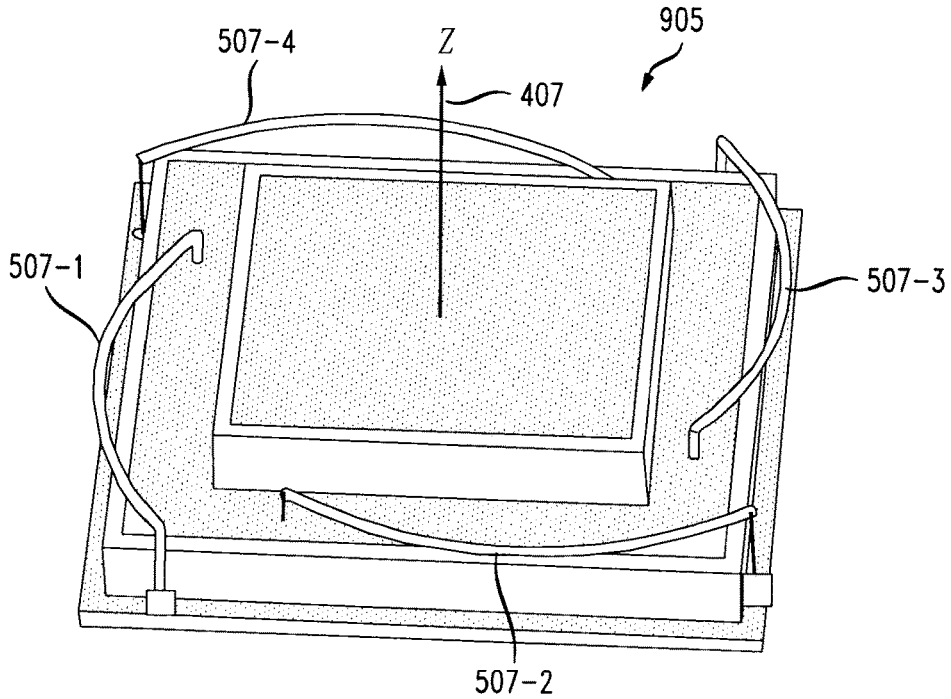
FIG. 9B shows the dual-band antenna of FIG. 9A wherein wires connecting the ground plane and patch are bent in accordance with an embodiment.

Another embodiment, antenna 900 shown in FIG. 9A, includes each wire 505-n (e.g., 505-1) turned in a certain angle $\alpha$ about vertical z-axis 901-n (e.g., z-axis 901-1) located in the center of segment 508-n (e.g., 508-1) belonging to wire 505-n. In accordance with this embodiment, the wire segments are formed to be straight in nature. The division of wire 505-n into segments 506-n (e.g., 506-1), 507-n (e.g., 507-1) and 508-n (e.g., 508-1) is shown in FIG. 5B. Wires 505-n are arranged in a rotational symmetrical manner to vertical z-axis 407 located in the antenna center. FIG. 9A presents such a structure, z-axis 901-n (e.g., 901-1) is shown for the case n=1. As a variant, segments 507-n (e.g., 507-1, 507-2, 507-3, and 507-4) are formed to be bent (i.e., not straight) as illustrated in FIG. 9B showing illustrative antenna 905.

Figure 10A:
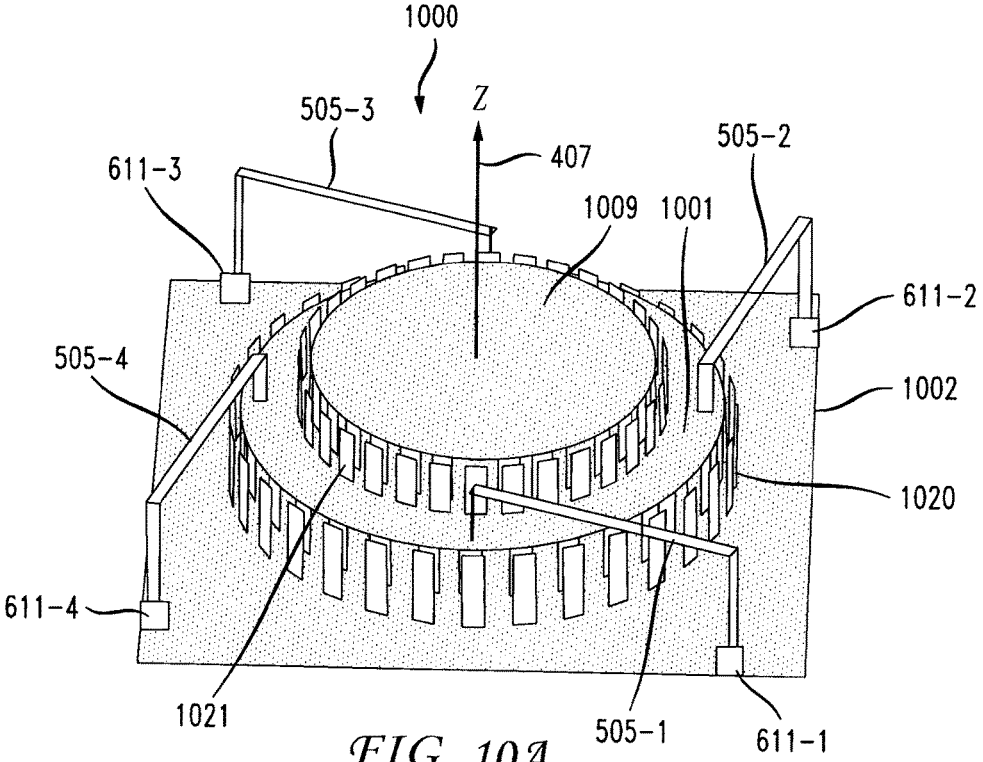
FIG. 10A shows an antenna wherein capacitive elements are used in accordance with an embodiment.

In accordance with the embodiment shown in FIG. 10A, the LF patch and HF patch can be circular with capacitive elements being used instead of dielectric. As shown, antenna 1000 has LF patch 1001 over ground plane 1002, and HF patch 1009 is over LF patch. Capacitive elements of the LF band are made in the form of interdigital structure 1020 arranged along the perimeter of LF patch 1001, and capacitive elements of the HF band are also made as interdigital structure 1021 along the perimeter of HF patch 1009. As configured in this embodiment, an interdigital structure (e.g., interdigital structures 1020 and 1021) is a set of wire pairs. For LF interdigital structure 1020, one wire in the pair is connected to ground plane 1002, and the other wire to LF patch 1001. For HF interdigital structure 1021, one wire in the pair is connected to LF patch 1001, and the other wire to HF patch 1009.

Figure 10B:
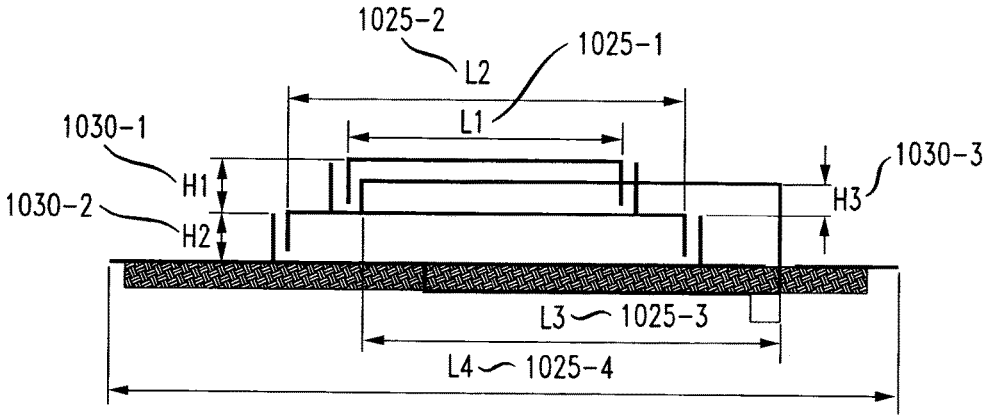
FIG. 10B shows a side view of the antenna embodiment shown in FIG. 10A.

FIG. 10B shows a side of view of the antenna embodiment shown in FIG. 10A. The parameters of the antenna structure according to designations 1025-1, 1025-2, 1025-3, 1030-1, 1030-2, and 1030-3 shown in FIG. 10B are as follows:

| | |
|---|---|
| L1 (1025-1) | 54 mm |
| L2 (1025-2) | 71 mm |
| L3 (1025-3) | 55 mm |
| L4 (1025-4) | 105 mm |
| H1 (1030-1) | 8 mm |
| H2 (1030-2) | 12 mm |
| H3 (1030-3) | 10 mm |

Figure 11A:
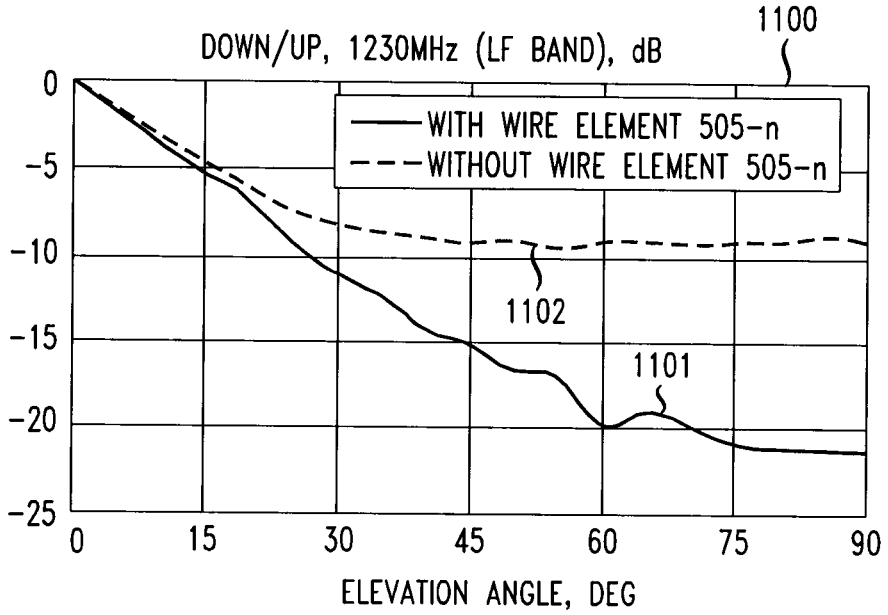
FIG. 11A illustrates Down/Up ratio for the antenna embodiment shown in FIG. 10A, for frequency 1230 MHz.
Figure 11B:
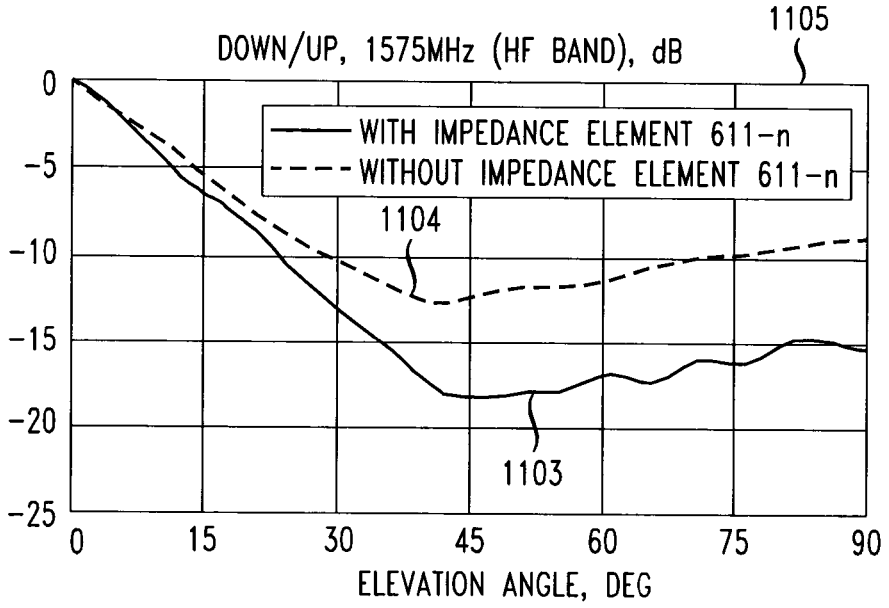
FIG. 11B illustrates Down/Up ratio for the antenna embodiment shown in FIG. 10A, for frequency 1575 MHz.

FIGS. 11A and 11B show graphs 1100 and 1105, respectively, reflecting experimental results of DU ratio for the antenna embodiment shown in FIG. 10A. Elements with reactive impedance 611-n are configured in accordance with FIGS. 6C and 6D. In FIG. 11A, graph 1100 is representative of a frequency 1230 MHz (LF band). Plot 1101 corresponds to the presence of wires 505-n, and plot 1102 to the absence of wires 505-n. As evident from FIG. 11A, the presence of wires 505-n results in a substantial reduction in DU ratio such that this ratio decreases from −8 dB up to −22 dB in the nadir direction.

In FIG. 11B, graph 1105 is representative of a frequency 1575 MHz (HF band). Plot 1103 corresponds to the presence of impedance elements 611-n, and plot 1104 corresponds to the absence of impedance elements 611-n and at that wires 505-n are connected directly to ground plane 1002. As evident from FIG. 11B, the presence of elements 611-n reduces DU ratio from −8 up to −15 dB in the nadir direction.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A single-band circularly-polarized antenna comprising:

a ground plane;

a radiating patch disposed above the ground plane;

a dielectric disposed between the ground plane and the radiating patch;

a plurality of wires symmetrically oriented about an antenna axis of symmetry orthogonal to the ground plane and passing through a center of the single-band circularly-polarized antenna, each wire having a first endpoint connected to the ground plane and a second endpoint connected to the radiating patch, the first endpoint and the second endpoint being connected by a horizontal wire segment connected between a first vertical wire segment and a second vertical wire segment, the horizontal wire segment being parallel with the ground plane and the radiating patch and positioned above the radiating patch, and the first vertical wire segment and the second vertical wire segment being orthogonal to the ground plane and the radiating patch; and wherein the symmetric orientation of the plurality of wires provides for generation of an electrical current through each horizontal wire segment of each wire of the plurality of wires such that a total antenna field in a nadir direction of the single-band circularly-polarized antenna is reduced.

2. The single-band circularly-polarized antenna of claim 1 wherein the single-band circularly-polarized antenna is a right-hand circularly polarized antenna.

3. The single-band circularly-polarized antenna of claim 2 wherein the plurality of wires comprises four wires and the respective horizontal wire segment of each wire is straight.

4. The single-band circularly-polarized antenna of claim 2 wherein the plurality of wires comprises four wires and the respective horizontal wire segment of each wire has at least one bend.

5. The single-band circularly-polarized antenna of claim 2 wherein at least one horizontal wire segment has a length determined as a function of wavelength.

6. The single-band circularly-polarized antenna of claim 5 wherein the [wavelength is] *at least one horizontal wire segment has a length* equal to a quarter of a wavelength.

7. The single-band circularly-polarized antenna of claim 2 wherein the radiating patch is excited by an excitation circuit connected to a plurality of excitation pins.

8. The single-band circularly-polarized antenna of claim 2 wherein the ground plane has a length that is equal to the radiating patch.

9. The single-band circularly-polarized antenna of claim 2 wherein the respective horizontal wire segments in combination with the ground plane form a transmission line such that the transmission line is connected to the radiating patch.

10. The single-band circularly-polarized antenna of claim 2 wherein the reduction of the total antenna field in the nadir direction is a function of a variation between a first electromagnetic field associated with the plurality of wires and a second electromagnetic field associated with the radiating patch.

11. A dual-band circularly-polarized antenna comprising:

a ground plane;

a low frequency (LF) radiating patch, the LF radiating patch disposed above the ground plane;

a first dielectric disposed between the ground plane and the LF radiating patch;

a high frequency (HF) radiating patch, the HF radiating patch disposed above the LF radiating patch;

a second dielectric disposed between the HF radiating patch and the LF radiating patch;

a plurality of reactive impedance elements symmetrically oriented about an antenna axis of symmetry orthogonal to the ground plane and passing through a center of the dual-band circularly-polarized antenna, the plurality of reactive impedance elements configured to produce a short-circuit condition in a LF band, and substantially open-circuit condition within a HF band;

a plurality of wires symmetrically oriented about the antenna axis of symmetry orthogonal to the ground plane and passing through the center of the dual-band circularly-polarized antenna, each wire having a first endpoint connected to a first one of the reactive impedance elements with the first one of the reactive impedance elements connected to the ground plane, and a second endpoint connected to a second one of the reactive impedance elements with the second one of the reactive impedance elements connected to the LF radiating patch, the first endpoint and the second endpoint being connected by a horizontal wire segment connected between a first vertical wire segment and a second vertical wire segment, the horizontal wire segment being parallel with the ground plane and the LF radiating patch and positioned above the LF radiating patch, and the first vertical wire segment and the second vertical wire segment being orthogonal to the ground plane, the LF radiating patch and the HF radiating patch; and wherein the symmetric orientation of the plurality of wires provides for generation of an electrical current through each horizontal wire segment of each wire of the plurality of wires such that a total antenna field in a nadir direction of the dual-band circularly-polarized antenna is reduced.

12. The dual-band circularly-polarized antenna of claim 11 wherein the dual-band circularly-polarized antenna is a right-hand circularly polarized antenna.

13. The dual-band circularly-polarized antenna of claim 12 wherein the plurality of wires comprises four wires and the respective horizontal wire segment of each wire is straight.

14. The dual-band circularly-polarized antenna of claim 12 wherein the plurality of wires comprises four wires and the respective horizontal wire segment of each wire has at least one bend.

15. The dual-band circularly-polarized antenna of claim 12 wherein at least one horizontal wire segment has a length determined as a function of wavelength.

16. The dual-band circularly-polarized antenna of claim 15 wherein the [wavelength is] *at least one horizontal wire segment has a length* equal to a quarter of a wavelength of the LF band.

17. The dual-band circularly-polarized antenna of claim 12 wherein the respective horizontal wire segments in combination with the ground plane form a respective transmission line, and the respective transmission line is connected to the LF radiating patch.

18. The dual-band circularly-polarized antenna of claim 17 wherein at least one reactive impedance element of the plurality of reactive impedance elements includes a micro strip line.

19. The dual-band circularly-polarized antenna of claim 18 wherein the micro strip line and a dielectric substrate located below the ground plane are subject to an electrical short there between.

[20. The dual-band circularly-polarized antenna of claim 12 wherein the ground plane has a length that is equal to the LF radiating patch and the HF radiating patch.]

21. The dual-band circularly-polarized antenna of claim 12 wherein the reduction of the total antenna field in the nadir direction is a function of a variation between a first electromagnetic field associated with the plurality of wires and a second electromagnetic field associated with the LF radiating patch.

22. The dual-band circularly-polarized antenna of claim 21 where the variation is determined by subtracting the second electromagnetic field from the first electromagnetic field.

23. The single-band circularly-polarized antenna of claim 10 wherein the variation is determined by subtracting the second electromangeitc field from the first electromagnetic field.

* * * * *